United States Patent [19]

Ono

[11] Patent Number: 5,245,699
[45] Date of Patent: Sep. 14, 1993

[54] INFERENCE PROCESSOR USING METAL KNOWLEDGE

[75] Inventor: Kenji Ono, Fujisawa, Japan

[73] Assignee: Kabushiki Kaisha Toshiba, Kawasaki, Japan

[21] Appl. No.: 729,206

[22] Filed: Jul. 12, 1991

Related U.S. Application Data

[63] Continuation-in-part of Ser. No. 349,830, May 10, 1989, Pat. No. 5,047,951.

[30] Foreign Application Priority Data

May 12, 1988 [JP] Japan .................. 63-115341

[51] Int. Cl.$^5$ ............................................. G06F 15/00
[52] U.S. Cl. ........................................................ 395/64
[58] Field of Search ............................................. 395/64

[56] References Cited

U.S. PATENT DOCUMENTS

| | | | |
|---|---|---|---|
| 4,704,695 | 11/1987 | Kimura et al. | 364/513 |
| 4,761,746 | 8/1988 | Tano et al. | 364/513 |
| 4,783,752 | 11/1988 | Kaplan | 364/513 |
| 4,847,784 | 7/1989 | Clancey | 364/513 |
| 4,849,905 | 7/1989 | Loeb et al. | 364/513 |
| 4,853,873 | 8/1989 | Tsuji et al. | 364/513 |
| 4,890,240 | 12/1989 | Loeb et al. | 364/513 |

FOREIGN PATENT DOCUMENTS 60-72031 4/1985 Japan .
62-19940 1/1987 Japan .

*Primary Examiner*—Allen R. MacDonald
*Attorney, Agent, or Firm*—Oblon, Spivak, McClelland, Maier & Neustadt

[57] ABSTRACT

An inference processor includes a production rule memory, a meta knowledge generator, a meta knowledge memory, a production system interpreter, and a working memory. The meta knowledge generator obtains production rules satisfying transition conditions between all the combinations of the states of the respective variables in the production rules as a directed-graph matrix. The meta knowledge generator then decomposes the directed-graph matrix into strongly connected components, and obtains, as meta knowledge, 1) variable-conditions of the respective strongly-connected components and 2) productions rules satisfying transition conditions between the respective strongly-connected components. The interpreter generally determines an inference path from a given state to another state as a target, on the basis of the meta knowledge, and efficiently executes production rules, thereby performing inference processing.

4 Claims, 23 Drawing Sheets

| PRODUCTION RULE | CONDITION (IF) PART | CONCLUSION (THEN) PART |
|---|---|---|
| R1 | y = a | y = b |
| R2 | y = c | y = b |
| R3 | y = b | x = b |
| R4 | x = b ∧ y = a | x = c ∧ y = c |
| R5 | x = c | y = a |
| R6 | y = b | y = c |
| R7 | x = a | x = b |

| PRODUCTION RULE | CONDITION (IF) PART | CONCLUSION (THEN) PART |
|---|---|---|
| R 1 | $y = a$ | $y = b$ |
| R 2 | $y = c$ | $y = b$ |
| R 3 | $y = b$ | $x = b$ |
| R 4 | $x = b \wedge y = a$ | $x = c \wedge y = c$ |
| R 5 | $x = c$ | $y = a$ |
| R 6 | $y = b$ | $y = c$ |
| R 7 | $x = a$ | $x = b$ |

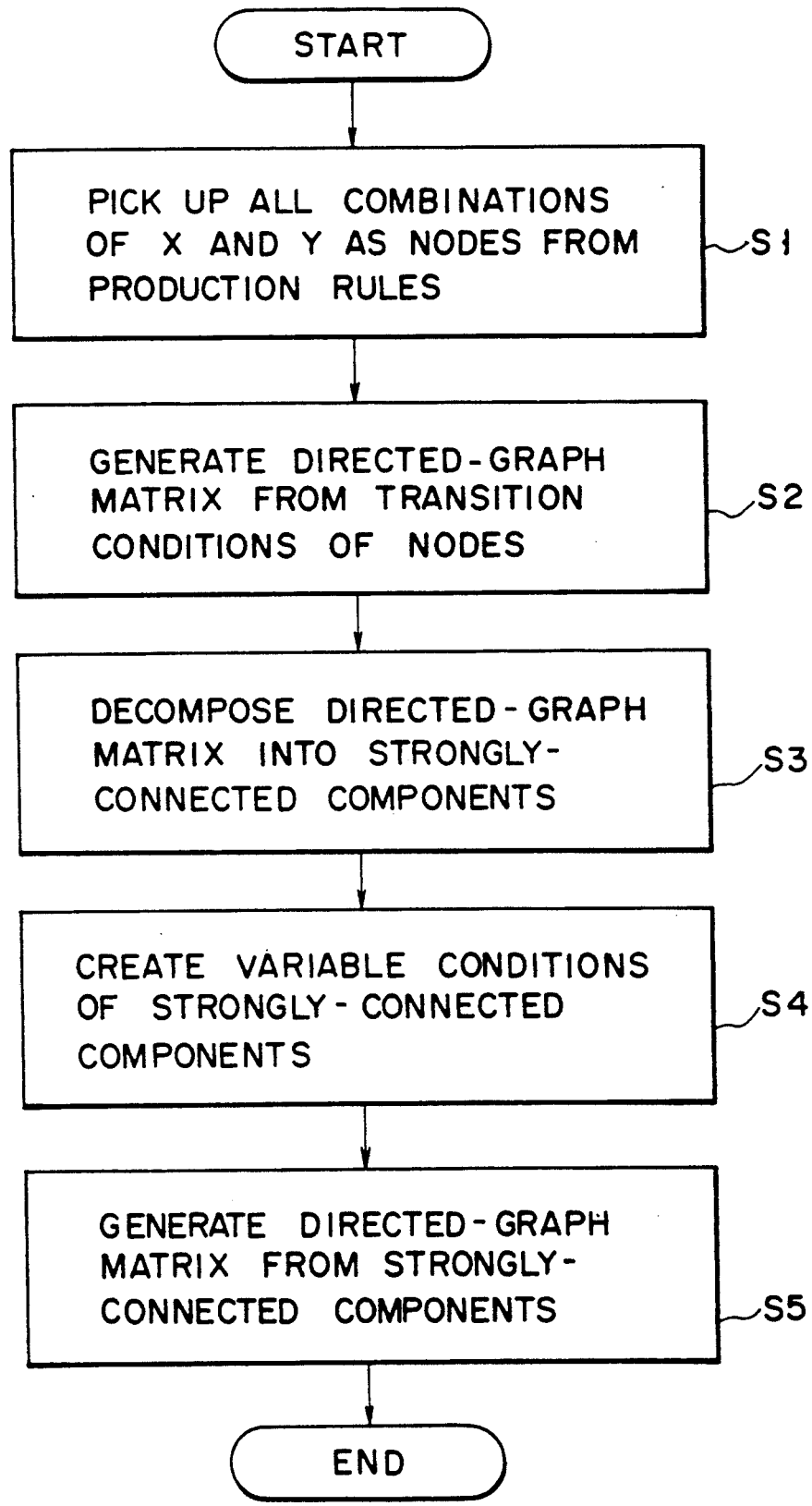
F I G. 3

| NODE | STATE |
|------|-------|
| N 1 | $x = a \land y = a$ |
| N 2 | $x = a \land y = b$ |
| N 3 | $x = a \land y = c$ |
| N 4 | $x = b \land y = a$ |
| N 5 | $x = b \land y = b$ |
| N 6 | $x = b \land y = c$ |
| N 7 | $x = c \land y = a$ |
| N 8 | $x = c \land y = b$ |
| N 9 | $x = c \land y = c$ |

| Nk / Nj | N1 | N2 | N3 | N4 | N5 | N6 | N7 | N8 | N9 |
|---|---|---|---|---|---|---|---|---|---|
| N1 |  | R1 |  | R7 |  |  |  |  |  |
| N2 |  |  | R6 |  | R3, R7 |  |  |  |  |
| N3 |  | R2 |  |  |  | R7 |  |  |  |
| N4 |  |  |  |  | R1 |  |  |  | R4 |
| N5 |  |  |  |  | R3 | R6 |  |  |  |
| N6 |  |  |  |  | R2 |  |  |  |  |
| N7 |  |  |  |  |  |  |  | R5 | R1 |
| N8 |  |  |  |  | R3 |  |  | R5 |  | R6 |
| N9 |  |  |  |  |  |  |  | R5 | R2 |  |

FIG. 7

| Nk / Nj | N1 | N2 | N3 | N4 | N9 | N8 | N7 | N5 | N6 | |
|---|---|---|---|---|---|---|---|---|---|---|
| N1 |  | R1 |  | R7 |  |  |  |  |  | } I |
| N2 |  |  | R6 |  |  |  |  | R3, R7 |  | } II |
| N3 |  | R2 |  |  |  |  |  |  | R7 | |
| N4 |  |  |  |  | R4 |  |  | R1 |  | } III |
| N9 |  |  |  |  |  | R2 | R5 |  |  | |
| N8 |  |  |  |  | R6 |  | R5 | R3 |  | } IV |
| N7 |  |  |  |  |  | R1 | R5 |  |  | |
| N5 |  |  |  |  |  |  |  | R3 | R6 | } V |
| N6 |  |  |  |  |  |  |  | R2 | R2 | |

| I | $x=a \land y=a$ |
|---|---|
| II | $(x=a \land y=b) \lor (x=a \land y=c)$<br>$\equiv x=a \land y \neq a$ |
| III | $x=b \land y=a$ |
| IV | $(x=c \land y=a) \lor (x=c \land y=b) \lor (x=c \land y=c)$<br>$\equiv x=c$ |
| V | $(x=b \land y=b) \lor (x=b \land y=c)$<br>$\equiv x=b \land y \neq a$ |

FIG. 8

|  | I | II | III | IV | V |
|---|---|---|---|---|---|
| I<br>$x=a \land y=a$ |  | R1 | R7 |  |  |
| II<br>$x=a \land y \neq a$ |  | R2, R6 |  |  | R3, R7 |
| III<br>$x=b \land y=a$ |  |  |  | R4 | R1 |
| IV<br>$x=c$ |  |  |  | R1,R2<br>R5,R6 | R3 |
| V<br>$x=b \land y \neq a$ |  |  |  |  | R2,R3<br>R6 |

FIG. 9

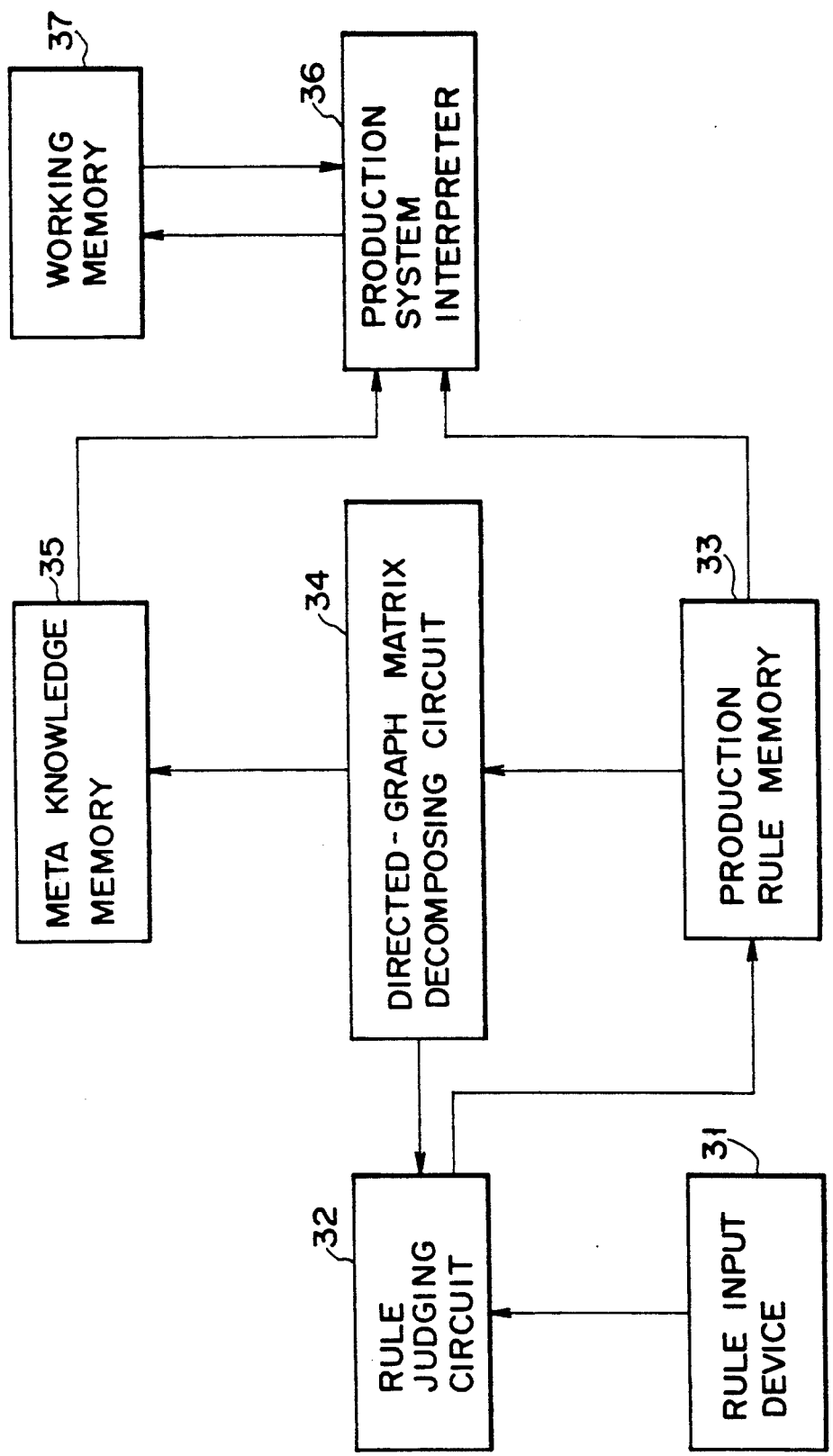
F I G. 12

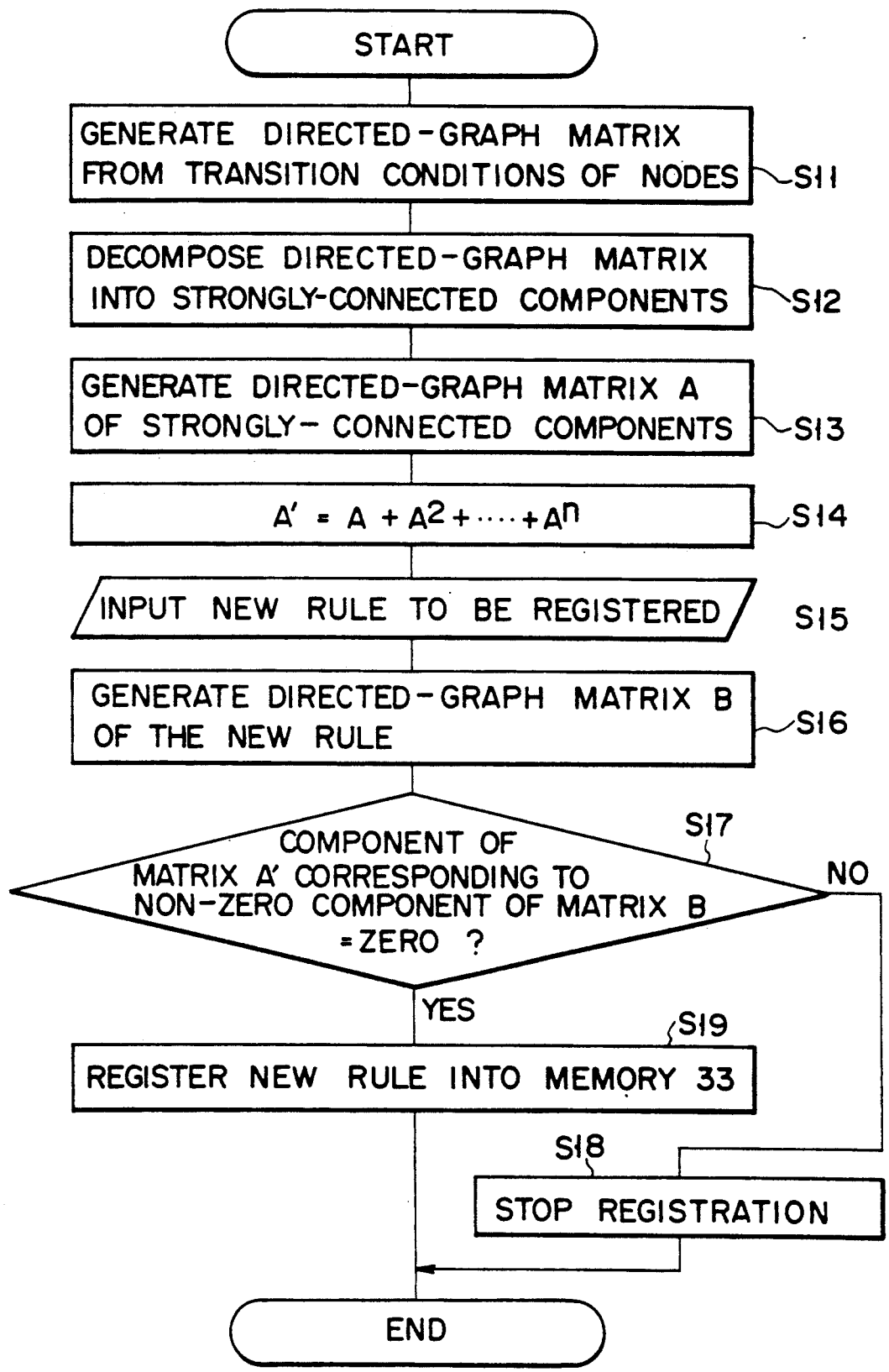
F I G. 14

| Nj \ Nk | N1 | N2 | N3 | N4 | N5 | N6 | N7 | N8 | N9 | |
|---|---|---|---|---|---|---|---|---|---|---|
| N1 |   |   | R1 |   |   |   |   |   |   | } I |
| N2 |   |   |   | R1 | R2 |   |   |   |   | } II |
| N3 |   |   |   | R2 |   |   |   |   |   | } III |
| N4 |   |   | R4 |   |   | R3 |   |   |   |   |
| N5 |   |   |   |   |   |   |   | R4 |   | } IV |
| N6 |   |   |   |   |   |   | R3 |   |   | } V |
| N7 |   |   |   |   |   |   |   | R1 |   |   |
| N8 |   |   |   |   |   |   | R2 |   | R3 | } VI |
| N9 |   |   |   |   |   |   | R4 |   |   |   |

FIG. 15

| I < III |
| II < III |
| II < IV |
| III < V |
| IV < VI |
| V < VI |

FIG. 17

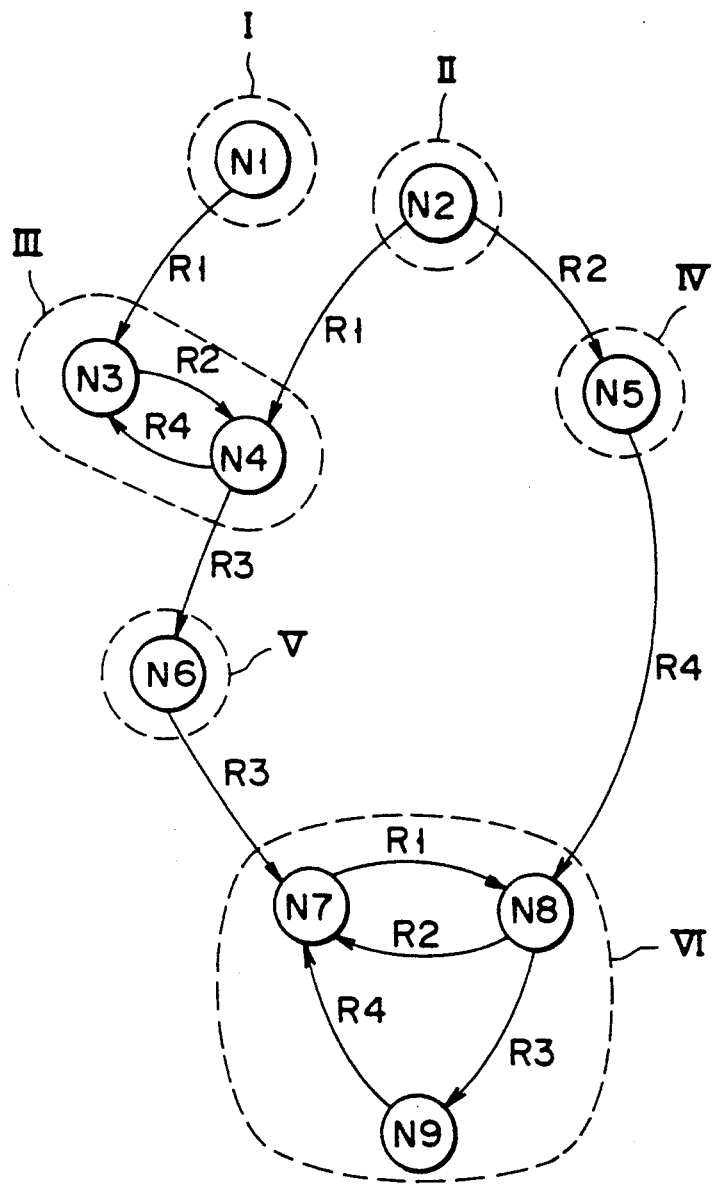
F I G. 16

|     | I | II | III | IV | V | VI |
|-----|---|----|-----|----|---|----|
| I   |   |    | 1   |    |   |    |
| II  |   |    | 1   | 1  |   |    |
| III |   |    | 1   |    | 1 |    |
| IV  |   |    |     |    |   | 1  |
| V   |   |    |     |    |   | 1  |
| VI  |   |    |     |    |   | 1  |

FIG. 18

|     | I | II | III | IV | V  | VI |
|-----|---|----|-----|----|----|----|
| I   |   |    | 6   |    | 5  | 10 |
| II  |   |    | 6   | 1  | 5  | 20 |
| III |   |    | 11  |    | 10 | 21 |
| IV  |   |    |     |    |    | 6  |
| V   |   |    |     |    |    | 6  |
| VI  |   |    |     |    |    | 6  |

FIG. 19

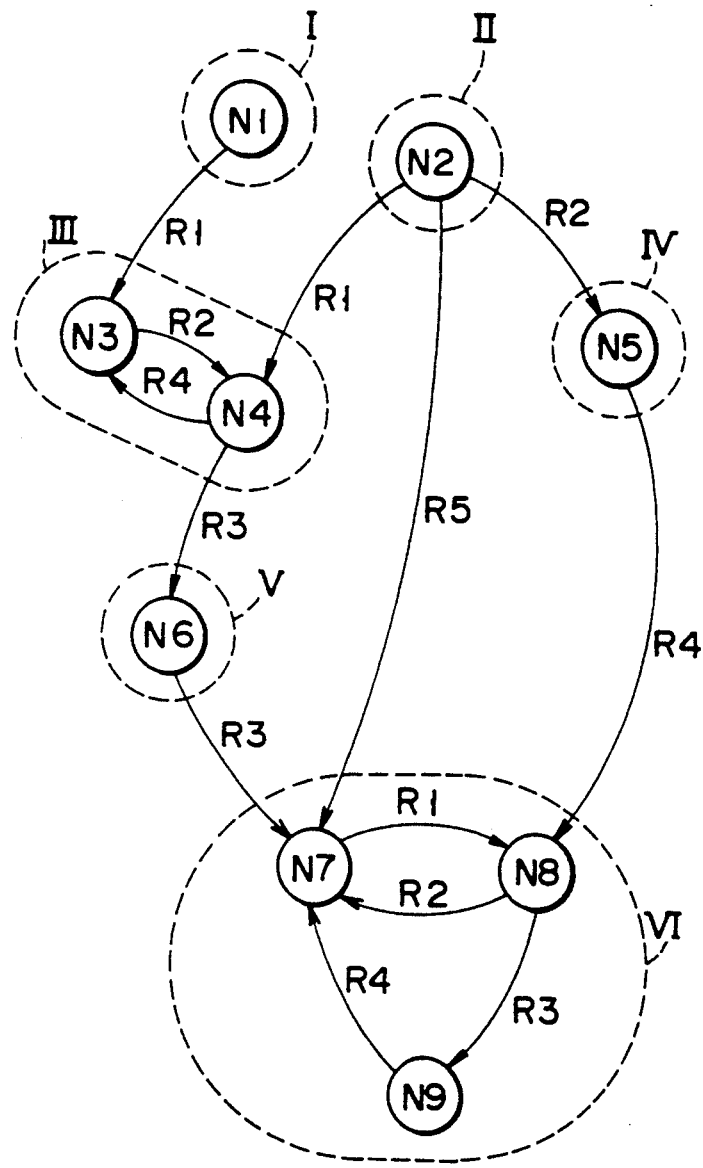
F I G. 20

|     | I | II | III | IV | V | VI |
|-----|---|----|----|----|---|----|
| I   |   |    |    |    |   |    |
| II  |   |    |    |    |   | 1  |
| III |   |    |    |    |   |    |
| IV  |   |    |    |    |   |    |
| V   |   |    |    |    |   |    |
| VI  |   |    |    |    |   | 1  |

F I G. 21

| I < III |
|---------|
| II < III |
| II < IV |
| III < V |
| IV < VI |
| V < VI |

F I G. 22

|     | I | II | III | IV | V | VI |
|-----|---|----|----|----|----|----|
| I   |   |    |    |    |    |    |
| II  |   |    |    |    |    |    |
| III | 1 |    |    |    |    |    |
| IV  |   |    |    |    | 1  |    |
| V   |   |    |    |    |    |    |
| VI  |   |    |    |    |    |    |

F I G. 24

| I < III , $\boxed{\text{III} < \text{I}}$ | → I' = I + III |
|---|---|
| II < ~~III~~ | → II < I' |
| II < IV | |
| ~~III~~ < V | → I' < V |
| IV < VI , $\boxed{\text{IV} < \text{V}}$ | |
| V < VI | |

F I G. 25

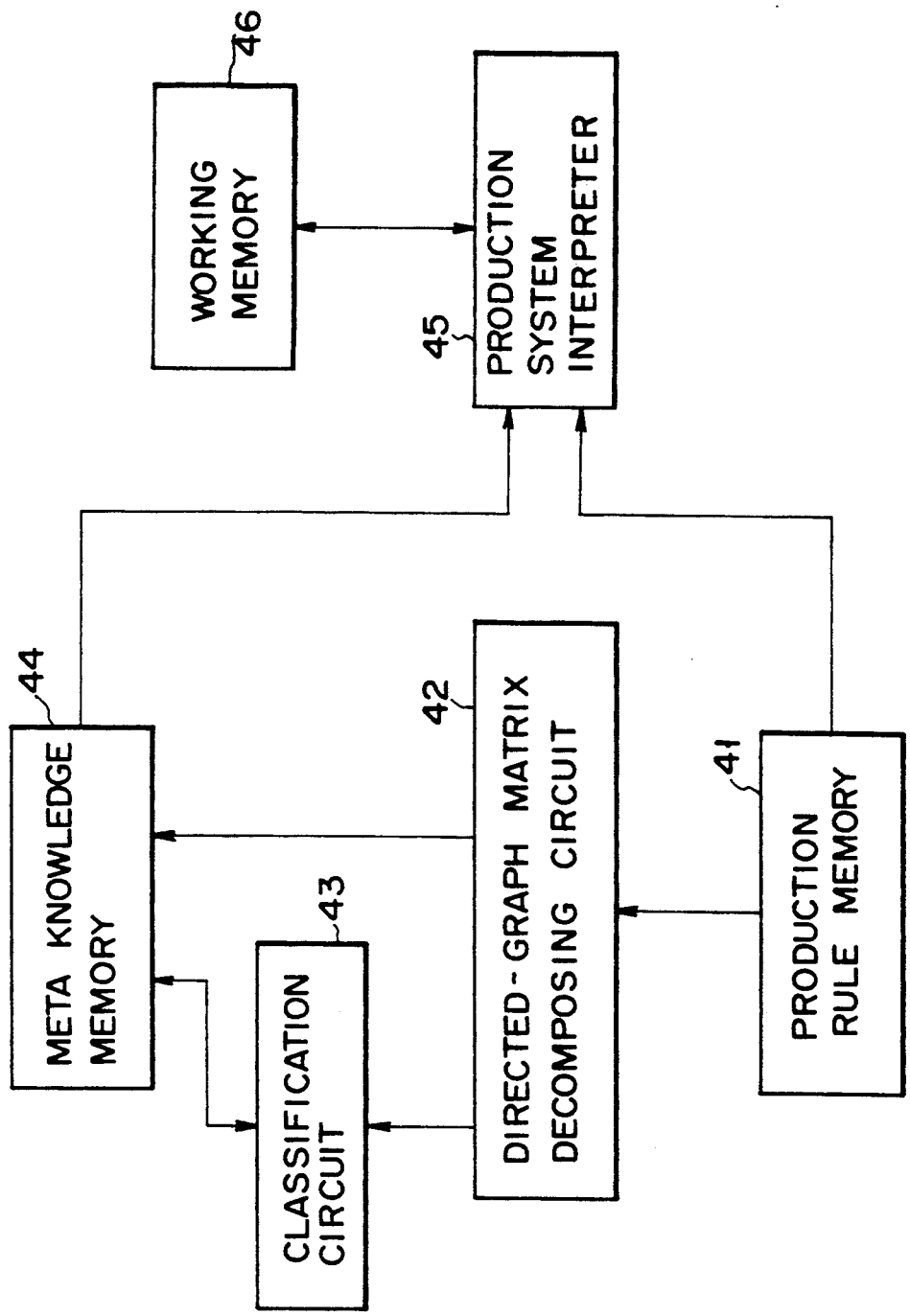
F I G. 26

| PRODUCTION RULE | CONDITION (IF) PART | CONCLUSION (THEN) PART |
|---|---|---|
| R 1 | $x = b \wedge y \neq a$ | $x = a$ |
| R 2 | $x = a$ | EXCHANGE x AND y |
| R 3 | $y = a$ | $x = b$, $y = c$ |
| R 4 | $y = a$ | $y = b$ |
| R 5 | $x = c \wedge y \neq a$ | $x = a$ |
| R 6 | $x = a \wedge y = c$ | $x = b$, $y = b$ |

FIG. 27

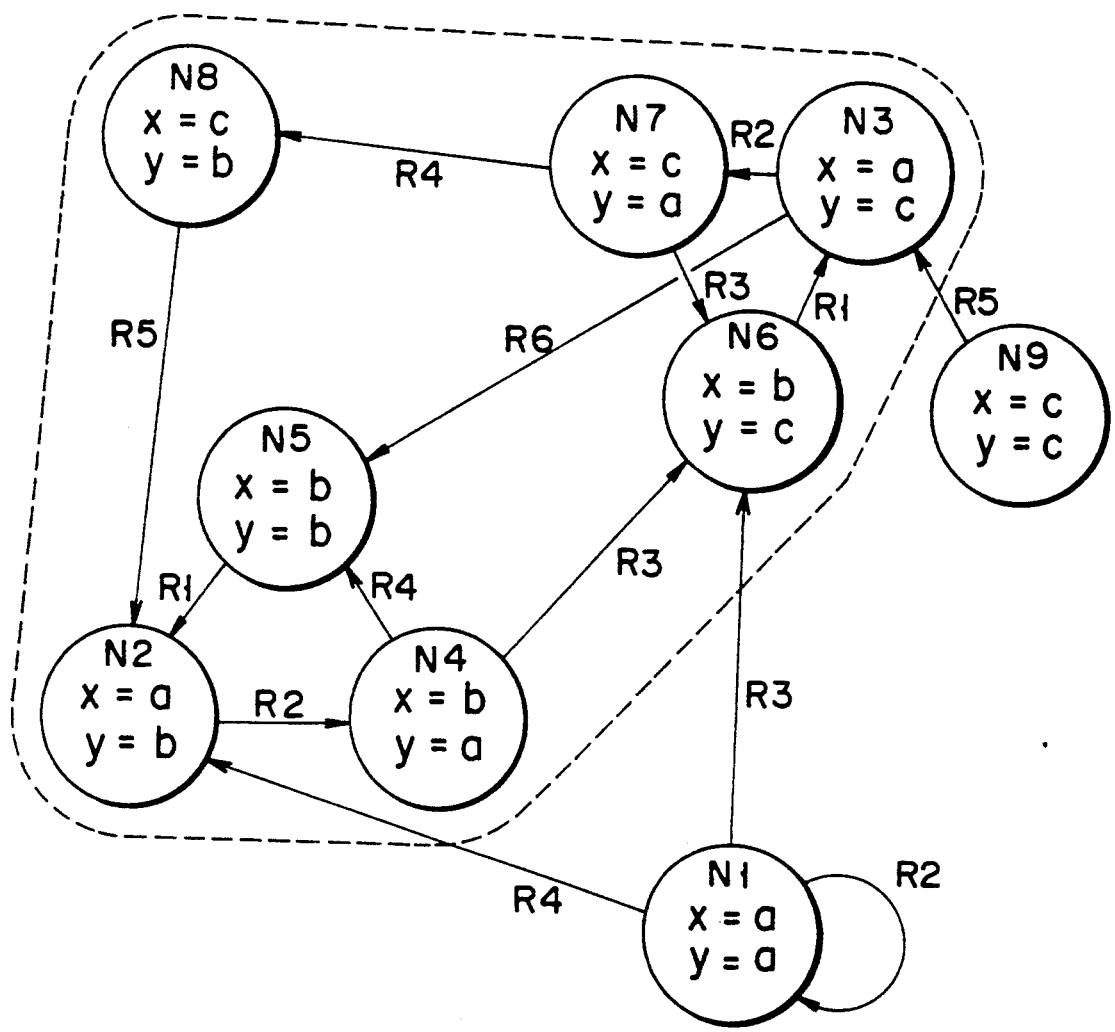
F I G. 28
| RULE | IF PART | THEN PART |
|---|---|---|
| R 6 | $x = a \wedge y = c$ | $x = b$, $y = b$ |
⇩
| R6 - a | $x = a \wedge y = c$ | $x = d$, $y = d$ |
|---|---|---|
| R6 - b | $x = d \wedge y = d$ | $x = b$, $y = b$ |
F I G. 29

INFERENCE PROCESSOR USING METAL KNOWLEDGE

CROSS-REFERENCE TO THE RELATED APPLICATIONS

This application is a continuation-in-part application of application Ser. No. 07/349,830 filed on May 10, 1989, now U.S. Pat. No. 5,047,951.

BACKGROUND OF THE INVENTION

1. Field of the Invention

The present invention relates to an inference processor for performing inference processing by executing production rules and, more particularly, to an inference processor designed to realize high-speed inference processing by choosing a production rule or rules which can be applicable in the next step beforehand in each step of the inference processing.

2. Description of the Related Art

In such a system for executing inference processing by using production rules, a single production rule having conditions matching data associated with a current state provided in inference processing and also matching a conclusion drawn in the course of inference is extracted from a large number of production rules. A final conclusion is drawn by using these extracted rules. In order to realize high-speed inference processing, it is effective to extract a rule applicable in the next step at high speed in each step of inference processing.

Japanese Patent Disclosure (Kokai) Nos. 60-72031 and 62-19940 disclose conventional systems of quickly extracting such production rules. In these conventional systems, condition and conclusion parts of each production rule are checked so that relationships representing a conclusion obtained by execution of which conclusion part satisfies which condition in the next step, i.e., relationships indicating application of which specific rule enables application of a specific rule in the next step, are prepared as a table or a network. In inference processing, a rule applicable in the next step is sequentially selected by referring to these relationships, thus realizing high-speed inference processing.

In these systems, however, since only application relationships between rules are prepared, only the speed of processing for selecting a rule or rules applicable in the next step can be increased. If a plurality of rules are selected, it is impossible to know which is the optimal rule. Therefore, knowledge associated with a general direction of inference concerning, e.g., whether or not a certain state leads to a specific state, or which rule should be applied to draw a certain conclusion from a certain state, and with a global structure of a search graph cannot be obtained. For this reason, an unnecessary rule may be executed, and it is difficult to further increase the speed of inference processing.

SUMMARY OF THE INVENTION

As described above, in the conventional inference processors, since a general direction of inference is not clear, an unnecessary production rule may be executed, and a further increase in speed of inference processing is interfered.

The present invention has been made in consideration of such a problem, and has as its object to provide a meta knowledge generating apparatus which can determine a general direction of inference processing and efficiently execute production rules, thereby realizing high-speed inference processing.

An apparatus for generating meta knowledge from production rules according to the present invention, comprises:

means for obtaining all states of each variable included in the production rules;

means for obtaining a first directed-graph matrix formed of production rules satisfying transition conditions between the combinations of the states of the variables;

means for decomposing the first directed-graph matrix into strongly-connected components;

means for obtaining states of variables of the respective strongly-connected components; and means for obtaining a second directed-graph matrix formed of production rules satisfying transition conditions between the strongly-connected components, the states of the variables and the second directed-graph matrix forming meta knowledge.

According to the present invention, a general direction of inference can be determined from meta knowledge. An application order of the production rules for drawing a final conclusion is determined on the basis of the meta knowledge. The production rules are extracted in this order to execute inference processing. Therefore, execution of unnecessary production rules can be prevented, and the speed of inference processing can be further increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a flow chart showing a sequence of operations of a meta knowledge generator of the first embodiment;

FIG. 4 shows all combinations (nodes) of states which a represented by variables included in the production rules shown in FIG. 2;

FIG. 6 shows a directed-graph matrix representing the transition conditions between the nodes shown in FIG. 4;

FIG. 7 shows a matrix showing strongly-connected components which is obtained by decomposing the directed-graph matrix of FIG. 6;

FIG. 8 shows a table of variable-conditions of the respective strongly-connected components of FIG. 7;

FIG. 9 shows a directed-graph matrix showing transition conditions between the strongly-connected components of FIG. 7;

FIG. 12 is a block diagram showing an inference processor according to a third embodiment of the present invention;

FIG. 14 is a flow chart showing a rule registration operation of the third embodiment;

FIG. 15 shows a directed-graph matrix of the production rules of FIG. 13;

FIG. 16 shows a strongly-connected components of the production rules of FIG. 13;

FIG. 17 shows a partial order of the strongly-connected components of FIG. 16;

FIG. 18 shows a directed-graph matrix A of the strongly-connected components of FIG. 17;

FIG. 19 shows a directed-graph matrix A' obtained from the matrix A of FIG. 18;

FIG. 20 shows an example of a rule to be registered;

FIG. 21 shows a directed-graph matrix B of the strongly-connected components obtained by registering the rule shown in FIG. 20;

FIG. 22 shows a partial order of the strongly-connected components of FIG. 21;

FIG. 24 shows a directed-graph matrix B of the strongly-connected components obtained by registering the rule shown in FIG. 23;

FIG. 25 shows a partial order of the strongly-connected components of FIG. 24;

FIG. 26 is a block diagram showing an inference processor according to a fourth embodiment of the present invention;

FIG. 27 shows production rules included in the inference processor of the fourth embodiment;

FIG. 28 shows a strongly-connected components of the production rules of FIG. 27;

FIG. 29 shows a division of the production rule into sub rules;

DETAILED DESCRIPTION OF THE PREFERRED EMBODIMENTS

Figures 1, 2:
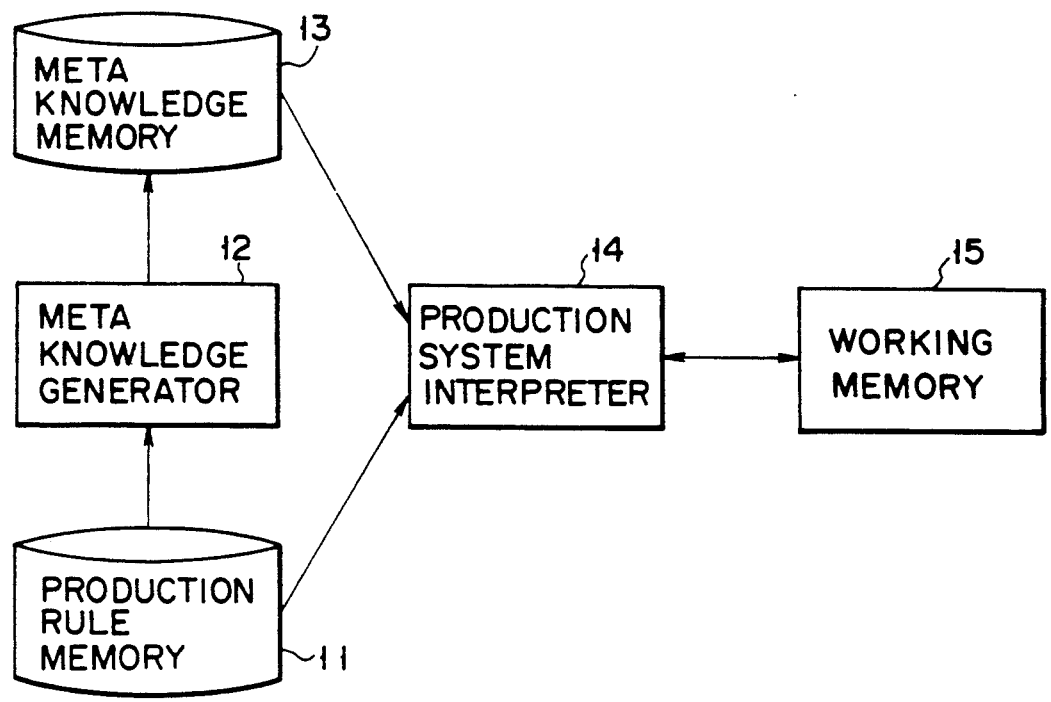
FIG. 1 is a block diagram showing an inference processor according to a first embodiment of the present invention.
FIG. 2 shows production rules included in the inference processor of the first embodiment.

Preferred embodiments of the present invention will now be described below with reference to the accompanying drawings. FIG. 1 is a block diagram showing an arrangement of an inference processor according to a first embodiment of the present invention. This inference processor comprises a production rule memory 11, a meta knowledge generator 12, a meta knowledge memory 13, a production system interpreter 14, and a working memory 15.

The production rule memory 11 stores a large number of production rules each formed of a pair of a condition part and a conclusion part. The meta knowledge generator 12 extracts given production rules stored in the production rule memory 11 prior to inference processing by the interpreter 14, and generates meta knowledge from the extracted production rules. More specifically, the meta knowledge generator 12 obtains production rules satisfying transition conditions between all the combinations of states which are represented by variables included in the production rules stored in the rule memory 11 as a directed-graph matrix, decomposes the directed-graph matrix into strongly-connected components, and obtains, as a meta knowledge, 1) variable-conditions of the respective strongly-connected components, 2) partial orders between the strongly-connected components, and 3) production rules satisfying transition conditions between the respective strongly-connected components. A sequence for calculating this meta knowledge w 11 be described in detail later with reference to FIG. 3.

The meta knowledge memory 13 stores the meta knowledge obtained by the meta knowledge generator 12. The interpreter 14 sequentially reads out the production rules stored in the production rule memory 11 and executes inference processing. The interpreter 14 generally determines an inference procedure for leading a given state to another state as a target on the basis of the meta knowledge stored in the meta knowledge memory 13, and efficiently executes the production rules. The working memory 15 stores an initial state or an intermediate state in inference processing in the interpreter 14.

An operation of the embodiment having the above-described arrangement will be described below. For the sake of a simple description, assume that seven production rules R1 to R7 shown in FIG. 2 are stored in the production rule memory 11. The condition and conclusion parts are also called if and then parts, respectively. In this case, x and y represent variables; and a, b, and c, states. That is, a rule defines specific states which the variables x and y having certain states will take next. Note that a variable which is not defined in the condition part can take any state, and that the state of a variable which is not defined in the conclusion part is not changed. For example, the Rule R1 states that if the variable y takes a state a, only the state of the variable y is changed to a state b regardless of the state of the variable x.

Prior to inference processing, the meta knowledge generator 12 generates meta knowledge from the production rules in accordance with a sequence shown in FIG. 3.

In step S1, the meta knowledge generator 12 checks the condition and conclusion parts of all the production rules stored in the production rule memory 11, and obtains all the combinations of the states of the respective variables used in the rules as nodes. Regarding the rules R1 to R7 shown in FIG. 2, since the two variables x and y can take the three states a, b, and c, respectively, nine nodes N1 to N9 can be obtained, as shown in FIG. 4. The total number of nodes is represented by n (in this case, nine).

Figure 5:
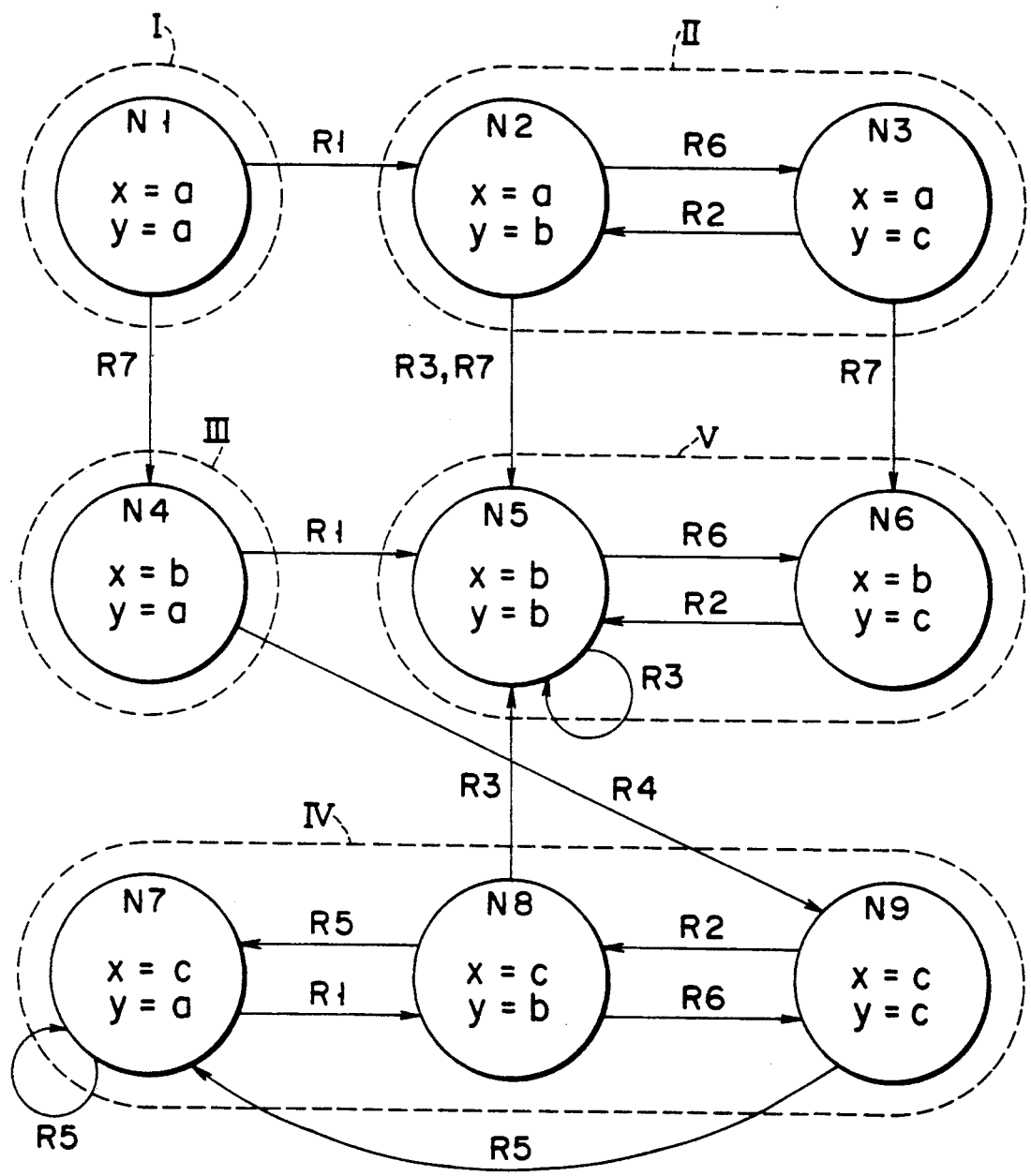
FIG. 5 shows a directed-graph representing the transition conditions between the nodes shown in FIG. 4.

In step S2, a directed-graph matrix is generated from transition conditions between nodes N1 to N9. If the nodes N1 to N9 shown in FIG. 4 are connected to each other by rules satisfying the transition conditions between the nodes, a directed-graph shown in FIG. 5 is obtained. If this graph is represented by a graph matrix, a directed-graph matrix shown in FIG. 6 is obtained. This matrix states rules Ri satisfies a transition condition from vertical nodes Nj to lateral nodes Nk. This matrix is obtained in practice in the following manner. A matrix (table) A having a size of n×n is prepared. When the states of the variables of the node Nj satisfy the condition part of the rule Ri, and the state of the variables of the node Nk are obtained as the execution result of the rule Ri, the rule Ri is registered in a (j, k) component of the matrix A.

In step S3, the directed-graph matrix of the nodes is decomposed into strongly-connected component. It this case, a strongly-connected component indicates a component constituted by nodes between which bidirectional transition can be possible. As shown in FIG. 5, the nodes N2 and N3; the nodes N5 and N6; and the nodes N7, N8, and N9 respectively constitute strongly-connected components. In addition, independent nodes are also regarded as strongly-connected components. In FIG. 5, portions enclosed by broken lines respectively indicate strongly-connected components. Upon decomposition of the directed-graph matrix, five strongly-connected components are extracted, which are respectively represented by Roman numerals I to V. In this case, the total number of strongly-connected components is given as m. A simultaneous replacement method is known as a method of decomposing a directed-graph matrix into strongly-connected components. This method is also used in this case. According to this method, replacement of rows and columns is simultaneously performed so as to set all the lower left components of the matrix to be zero, and square block matrices on the diagonal line of the matrix are set to be strongly-connected components. In FIG. 6, the rows and columns of the nodes N5 and N8; N5 and N6; and N5 and N9 are sequentially replaced with each other to decompose the directed-graph matrix into strongly-connected components, thereby obtaining a matrix shown in FIG. 7.

In step S4, the logical OR of the states (shown in FIG. 4) of variables corresponding to each node included in the strongly-connected components I to V shown in FIGS. 5 and 7 is calculated to obtain variable components. The strongly-connected components I to V respectively include the node N1; the nodes N2 and N3; and node N4; the nodes N9, N8, and N7; the nodes N5 and N6. The variable-conditions of the respective strongly-connected components are obtained as shown in FIG. 8. Note that simplified processing of the logical expressions can be performed by using a popular method for automatic design of a logical circuit and the like.

In step S5, a directed-graph matrix is obtained by using only production rules satisfying the transition conditions between the strongly-connected components. More specifically, a table B having a size of m×m (m being the total number of strongly-connected components) is prepared. If a node a belongs to a strongly-connected component c, and a node b belongs to a strongly-connected component d, a rule registered in an (a, b) component of the strongly-connected component decomposition matrix shown in FIG. 7 is registered in a (c, d) component of the table B. This operation is performed with respect the respective components (t, k) of the strongly-connected component decomposition matrix shown in FIG. 7. As a result, a directed-graph matrix shown in FIG. 9 is obtained. This directed-graph matrix is stored in the meta knowledge memory 13 as meta knowledge of the production rules stored in the production rule memory 11. In other words, the meta knowledge represents 1) variable-conditions of the respective strongly-connected components of the production rules and 2) production rules satisfying transition conditions between the respective strongly-connected components.

Figure 10:
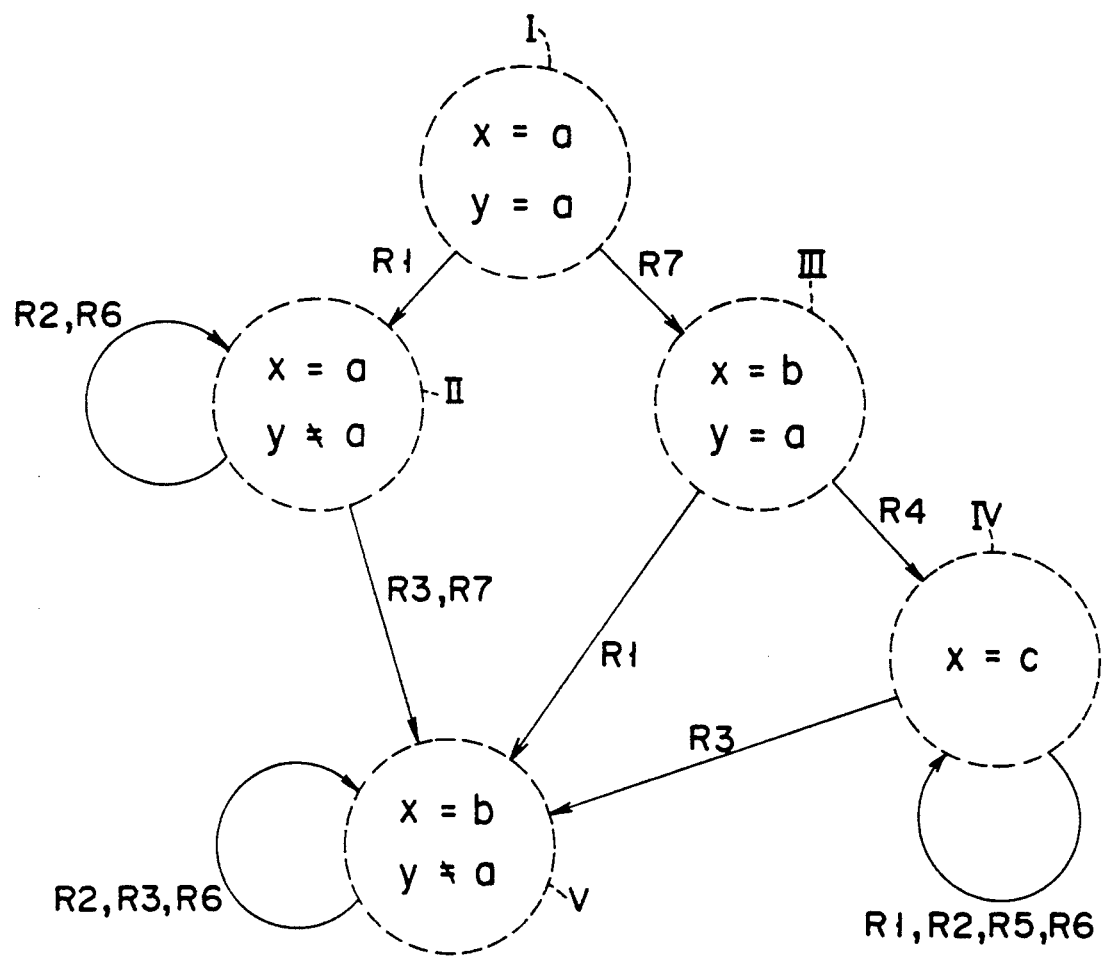
FIG. 10 shows a directed-graph showing transition conditions between the strongly-connected components of FIG. 7.

FIG. 10 shows a directed-graph representation which is based on the directed-graph matrix of FIG. 9 This directed-graph matrix shows the transition conditions between the strongly-connected components. A general direction of inference processing can be determined from this directed-graph matrix. Since this directed-graph is considerably simplified compared with the directed-graph shown in FIG. 5, this directed-graph can be stored in the meta knowledge memory 13 as the meta knowledge. If all the combinations of variables included in all the production rules shown in FIG. 5 are to be stored, a very large memory capacity is required. Hence, such an operation is not feasible in practice.

When the meta knowledge is generated, inference is started. The interpreter 14 generally directs the inference on the basis of the meta knowledge in the course of the inference. The interpreter 14 sequentially extracts and executes the production rules stored in the production rule memory 11, and stores results obtained in the course of the inference in the working memory 15. Assume that as an example of inference, it is required to determine whether x=c and y=a can be obtained as an inference result from an initial state of x=a and y=a.

Referring to the table B of FIG. 9, it is found that the initial state of x=a and y=a is included in a strongly-connected component I, and the inference result of x=c and y=a is included in a strongly-connected component IV. The interpreter 14 searches a path leading from the strongly-connected component I to the strongly-connected component IV. As a result, a path of I→III→IV is searched as a single available path. It is found that this result can be led from the initial state, though the order of execution (application) of the production rule is unknown. Further, it is found that in order to reach the final target state from the initial state, each of the rules R7 and R4 must be included in the rules to be sequentially applied, and the rule R4 must be applied after the execution of rule R7. Therefore, an optimal inference direction can be given as follows:

1) If the rule R7 can be applied, it must be immediately applied. Otherwise, other applicable rules are kept applied until the rule R7 becomes applicable while attention is paid not to allow transition to strongly-connected components other than the strongly-connected component I.

2) Similarly, if the rule R4 is applicable after the rule R7 is applied, the rule R4 is immediately applied. Otherwise, other applicable rules are kept applied until the rule R4 becomes applicable while attention is paid not to allow transition to strongly-connected components other than the strongly-connected component III.

3) After the rule R4 is applied, applicable rules are sequentially applied until the final target state is reached while attention is paid not to allow transition to components other than strongly-connected component IV.

In this embodiment, the rules R7 and R4 can be immediately applied in this order. After the application of the rule R4, the rule R5 is the only rule which can be applied without causing transition to components other than the strongly-connected component IV. If the rule R5 is applied in this case, the target state can be reached. Therefore, it is determined that a series of rules R7, R4, and R5 can lead the initial state to the target state.

Further, the interpreter 14 can obtain general knowledge concerning a direction of inference that if the Rule R1 is applied first, the target conclusion cannot be drawn, or that if the state corresponding to the strongly-connected component V is reached, transition to a state belonging to other strongly-connected components cannot be performed. This knowledge can be utilized for inference processing.

In the above embodiment, the interpreter 14 searches the path leading from the initial state to the inference result based on the directed-graph matrix shown in FIG. 9. The path can be searched faster if the partial order of the strongly-connected components is known. Therefore, it is desirable for the interpreter 14 to obtain the partial order of the strongly-connected components. The partial order represents that the transition direction between two adjacent strongly-connected components. In the case of FIG. 9, nine partial orders are obtained; I<II, I<III, II<II, II<V, III<IV, III<V, IV<IV, IV<V, and V<V. For example, partial order I<II represents that the component I can be directly transited to the component II. From the above partial orders, it is found that the component I can be transited to the component V since there are partial orders of I<II and II<V. The interpreter 14 can check the possibility of inference path between the given components.

Figure 11:
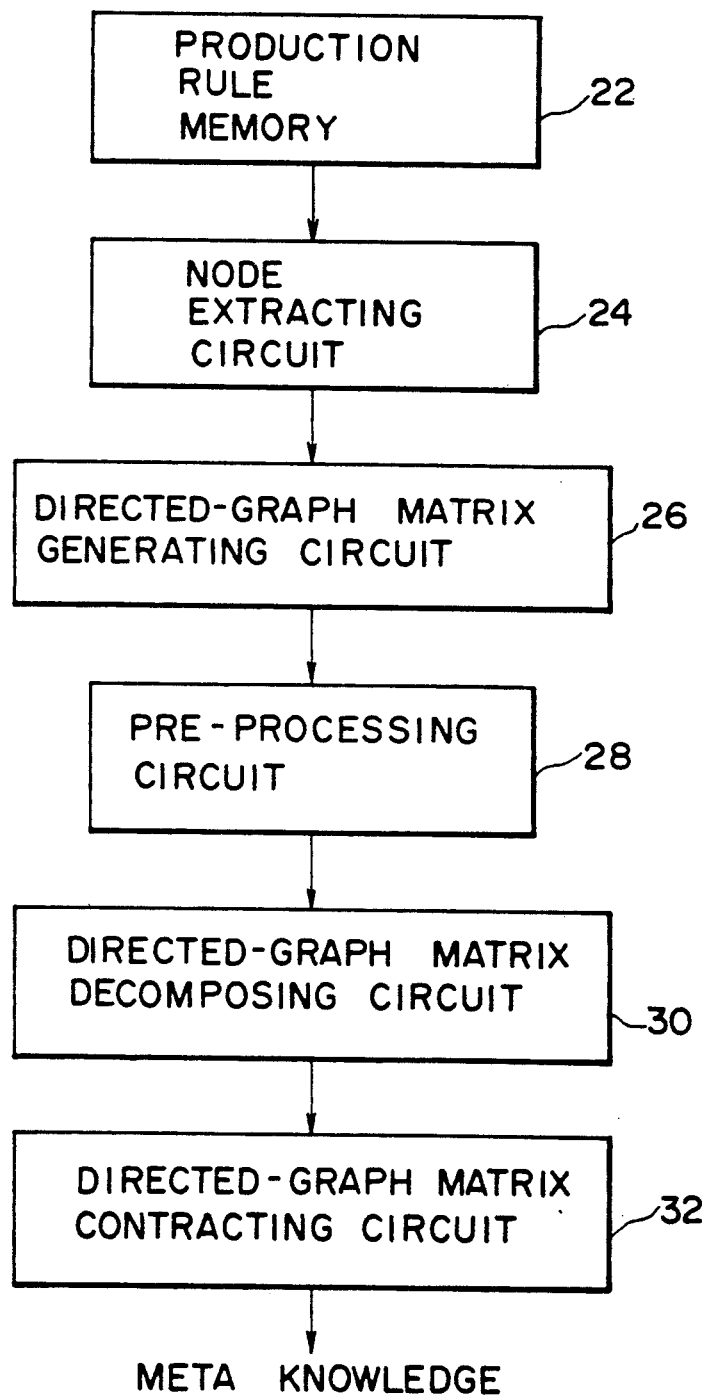
FIG. 11 is a block diagram showing a meta knowledge generating apparatus according to a second embodiment of the present invention.

Other embodiments of the present invention will now be described. FIG. 11 is a block diagram of a meta knowledge generating apparatus representing the second embodiment. This embodiment comprises a production rule memory 22 storing a large number of production rules each formed of a pair consisting of a condition part and a conclusion part, as shown in FIG. 2. A node extracting circuit 24 is connected to the production rule memory 22, checks the condition and conclusion parts of all the production rules stored in the production rule memory 22, and obtains all the combinations of the states of the respective variables included in the production rules as nodes, such as shown in FIG. 4.

It should be noted that the number of nodes can be extremely large, since there is usually a large number of combinations of states of the condition and conclusion parts. Therefore, in order to reduce the amount of calculation necessary for following processing, it is desirable to reduce the number of the nodes. One method of doing this is to delete an unnecessary node or nodes on the basis of the production rules. For example, if two variables always have the same value throughout the inference, both can be regarded as a single variable. Alternatively, if there is a variable which is not included in the condition part of any rule, that variable can be ignored. Further, if a variable x has an integer value varying from −50 to +50 by 1 but there are only three rules referring to the variable x, for example, "if x > 10, then . . . ", "if x = 10, then . . . ", and "if x < 10, then . . . ", it can be regarded that the variable x has only three values, for example, 9, 10, and 11. Other similar methods for reducing the number of nodes can be incorporated in the node extracting circuit 24, in accordance with how the variable is referred to and how it is updated in the respective production rules.

The output signal of the node extracting circuit 24 is supplied to a directed-graph matrix generating circuit 26. The circuit 26 generates a directed-graph matrix, as shown in FIG. 6, from transition conditions between all the nodes extracted by the node extracting circuit 24. The directed-graph matrix represents the production rule relating to the transition between the nodes. If a production rule is "if x=a, then y=b", the production rule relating to the transition from all nodes including a variable condition of "x=a" to nodes including the variable condition of "y=b" is registered as a transition rule for forming the directed-graph matrix.

The directed-graph matrix, which is usually a sparse matrix of large size, is supplied to a preprocessing circuit 28, where pre-processing for reducing the amount of calculation to be carried out in the following processing, such as a simultaneous replacement of the rows and columns of the matrix, is performed.

The output from the pre-processing circuit 28 is supplied to a directed-graph matrix decomposing circuit 30, which decomposes the directed-graph matrix of the nodes into strongly-connected components. A simultaneous replacement method is used for decomposing the directed-graph matrix into the strongly-connected components. According to this method, replacement of rows and columns is simultaneously performed so as to set all the lower left components of the matrix to be zero, and square block matrices on the diagonal line of the matrix are set to be strongly-connected components. In this case, a strongly-connected component indicates a component constituted by nodes between which bidirectional transition is possible.

The outputs of the directed-graph matrix circuit 30, i.e, the strongly-connected components, are supplied to a directed-graph matrix contracting circuit 32, which contracts the directed-graph matrix output from the directed-graph matrix generating circuit 26, in accordance with the strongly-connected components output from the directed-graph matrix decomposing circuit 30, and simplifies the logical OR of the states of variables each corresponding to a node included in the strongly-connected components. As a result, the contracting circuit 32 outputs meta knowledge which is simpler in form than the directed-graph matrix formed of the production rules stored in the production rule memory 22. From this meta knowledge, a general direction of inference processing can be determined.

While meta knowledge can be used for determining the general direction of inference processing, there are, however, many applications to which the meta knowledge thus obtained can be put. One example of another application of the meta knowledge is detecting redundancy of production rules in order to delete redundant rules from the production rule memory, as will now be described in a third embodiment.

FIG. 12 is a block diagram of the third embodiment of the present invention. The aim of the third embodiment is to control the registration of rules in the production rule memory, in order not to register a redundant rule therein. The third embodiment comprises a production rule input device 31, a production rule judging circuit 32, a production rule memory 33, a directed-graph matrix decomposing circuit 34, a meta knowledge memory 35, a production system interpreter 36, and a working memory 37.

The rule input device 31 inputs the production rule to be registered in the production rule memory 33.

When the rule is input, the input rule is supplied to the production rule judging circuit 32 which determines whether or not the strongly-connected components of the production rules stored in the production rule memory 33 will be changed upon the registration of the input rule. The input rule is registered only when it is determined that the strongly-connected components will be changed; otherwise, the rule will not be registered.

The production rule memory 33 stores those production rules which are determined as necessary to be registered by the judging circuit 32. As in the above embodiments, a production rule comprises a pair consisting of a condition part and a conclusion part.

The directed-graph matrix decomposing circuit 34 generates meta knowledge by extracting the production rules from the production rule memory 33 prior to inference processing in the production system interpreter 36. More specifically, the directed-graph matrix decomposing circuit 34 obtains production rules satisfying transition conditions between all the combinations of states which are represented by variables included in the production rules stored in the production rule memory 33, as a directed-graph matrix, decomposes the directed-graph matrix into strongly-connected components, and obtains, as meta knowledge, 1) variable-conditions of the respective strongly-connected components, 2) a partial order between the strongly-connected components, and 3) production rules satisfying transition conditions between the respective strongly-connected components.

The meta knowledge memory 35 stores the meta knowledge obtained by the directed-graph matrix decomposing circuit 34.

The production system interpreter 36 sequentially reads out the production rules stored in the production rule memory 33, and executes inference processing. The interpreter 36 generally determines an inference procedure for leading from a given state to another state as a target on the basis of the meta knowledge stored in the meta knowledge memory 35, and efficiently executes the production rules.

The working memory 37 stores an initial state or an intermediate state in inference processing in the interpreter 36.

Figure 13:
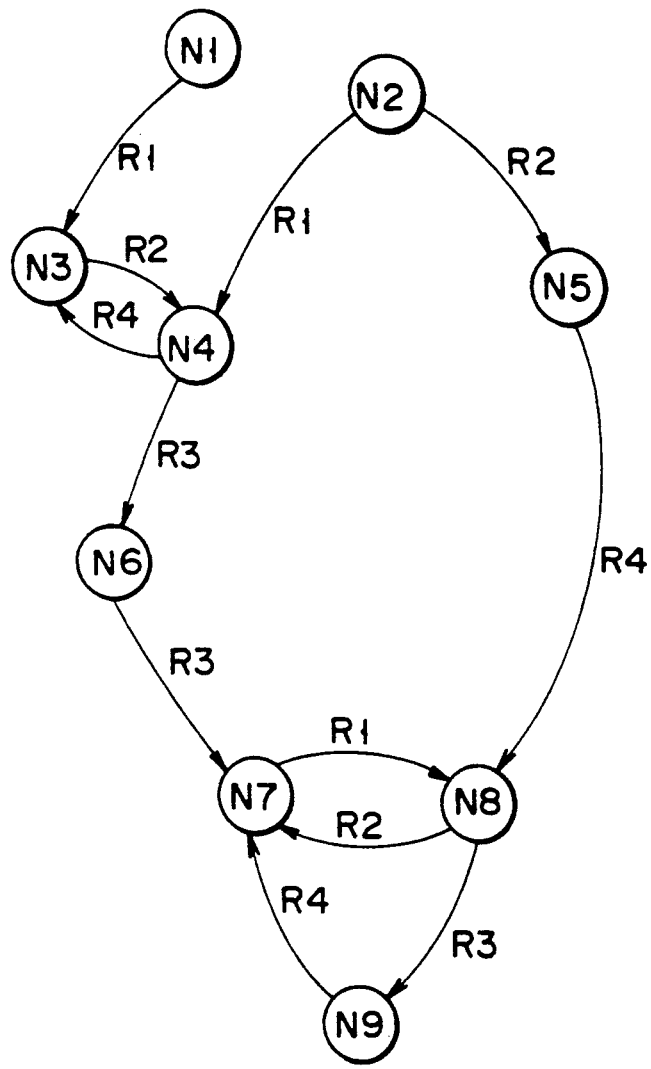
FIG. 13 shows production rules included in the inference processor of the third embodiment.

Operation of the third embodiment having the above-described arrangement will now be described. Assume that production rules represented by a directed-graph as shown in FIG. 13 are stored in the production rule memory 33. In this case, nodes N1 to N9 represent the states, and arrows connecting nodes represent production rules R1 to R4 which cause a transition of the states. It should be noted that the states of the nodes N1 to N in this embodiment differ from those of the nodes N1 to N9 in the first embodiment.

Prior to inference processing, the directed-graph matrix decomposing circuit 34 generates meta knowledge from the production rules according to procedures of steps S11 and S12 in the flowchart of FIG. 14. In step S11, the directed-graph matrix shown in FIG. 15 is generated, being formed by connecting the nine nodes N1 to N9 with production rules satisfying the transition condition between the nodes. The directed-graph matrix denotes the production rule capable of transition from the node Nj to Nk.

In order to obtain the directed-graph matrix, a matrix (table) C having a size of $9 \times 9$ is prepared in step S11. When the state of the node Nj satisfies the condition part of a rule Rx, and the state of the node Nk is obtained as the execution result of the rule Rx, the production rule Rx is registered in a (j, k) component of the matrix C. The remaining components other than the (j, k) component do not store the rule.

In step S12, the directed-graph matrix is decomposed into strongly-connected components. In this case, a strongly-connected component indicates a component constituted by nodes between which bidirectional transition is possible. In the case of FIG. 13, the nodes N3 and N4; and the nodes N7, N8, and N9 respectively constitute strongly-connected components. In addition, independent nodes are also regarded as strongly-connected components. A simultaneous replacement method of rows and columns is known as a method of decomposing a directed-graph matrix into strongly-connected components. This method is also used in this case. According to this method, replacement of rows and columns is simultaneously performed so as to set a predetermined portion of the matrix, for example, all the lower left components to zero, and components gathered on the diagonal line of the matrix are set to be strongly-connected components. In FIG. 15, zeros (no rules) are gathered in the lower left corner of the matrix. As a result, six strongly-connected components enclosed with broken lines and respectively represented by Roman numerals I to VI are extracted, as shown in FIG. 16. The strongly-connected components thus obtained are stored in the meta knowledge memory 35. Partial orders between the strongly-connected components are shown in FIG. 17.

In step S13, the judging circuit 32 generates a directed-graph matrix D of the strongly-connected components generated by the directed-graph matrix decomposing circuit 34. The directed-graph matrix D is shown in FIG. 18 and is a matrix of $m \times m$ (m is the number of the strongly-connected components). The matrix D is formed by registering "1" at an (i, j) component if it is possible to cause the state of the strongly-connected component i to transit to the state of the strongly-connected component j, in accordance with the application of a predetermined rule, and registering "0" if it is not.

In step S14, the judging circuit 32 calculates a matrix D' as follows:

$$D' = D + D^1 + D^2 + \ldots + D^n \qquad (1)$$

Here, the matrix Dn denotes the strongly-connected component which can be realized by applying the rule n times. Therefore, the matrix $D^2$ denotes the strongly-connected components which can be realized by applying the rule two times. It is possible to obtain all the components which can be realized by applying the rule n times. In this example, since n=6, the following equation is calculated:

$$D' = D + D^1 + D^2 + \ldots + D^6 \qquad (2)$$

No components can be found if the rule is applied more than six times. The matrix D' thus obtained is shown in FIG. 19.

Assume that a new rule is input by the input device 31 to be registered as shown in step S15, and that this input rule is a rule R5, as shown in FIG. 20. In step S16, the judging circuit 32 generates a directed-graph matrix E, shown in FIG. 21, which denotes a transition possibility between states produced by the application of the rule R5. As in the case of the matrix D, the matrix E is a matrix of $m \times m$ and is formed by registering "1" at an (i, j) component if it is possible to cause the state of the strongly-connected component i to transit to the state of the strongly-connected component j, in accordance with the application of a predetermined rule, and registering "0" if it is not. With regard to the rule R5 shown in FIG. 20, "1" is registered at components (II, VI) and (VI, VI), as shown in FIG. 21. Though not shown in FIG. 21, "0" is registered at the other components.

In step S17, the judging circuit 34 compares the matrix E with the matrix D' to determine whether or not the components of the matrix D' corresponding to the non-zero components of the matrix E are zero. If it is determined that all the corresponding components of the matrix D' are not zero, registration is stopped in step S18. Only if it is determined that the corresponding components of the matrix D' are zero, is the input rule registered into the memory 33 in step S19.

In this example, all the components of the matrix D' (FIG. 19) corresponding to the non-zero components of the matrix E (FIG. 21) are not zero, and therefore the rule R5 is not registered. This means that a new strongly-connected component cannot be obtained even if the rule R5 is registered. In other words, the rule R5 is redundant with regard to the rules R1 to R4. Therefore, the contents of the production rule memory 33 are not changed and the partial orders between the strongly-connected components are not changed after the input of the new rule R5, as shown in FIG. 22.

Figure 23:
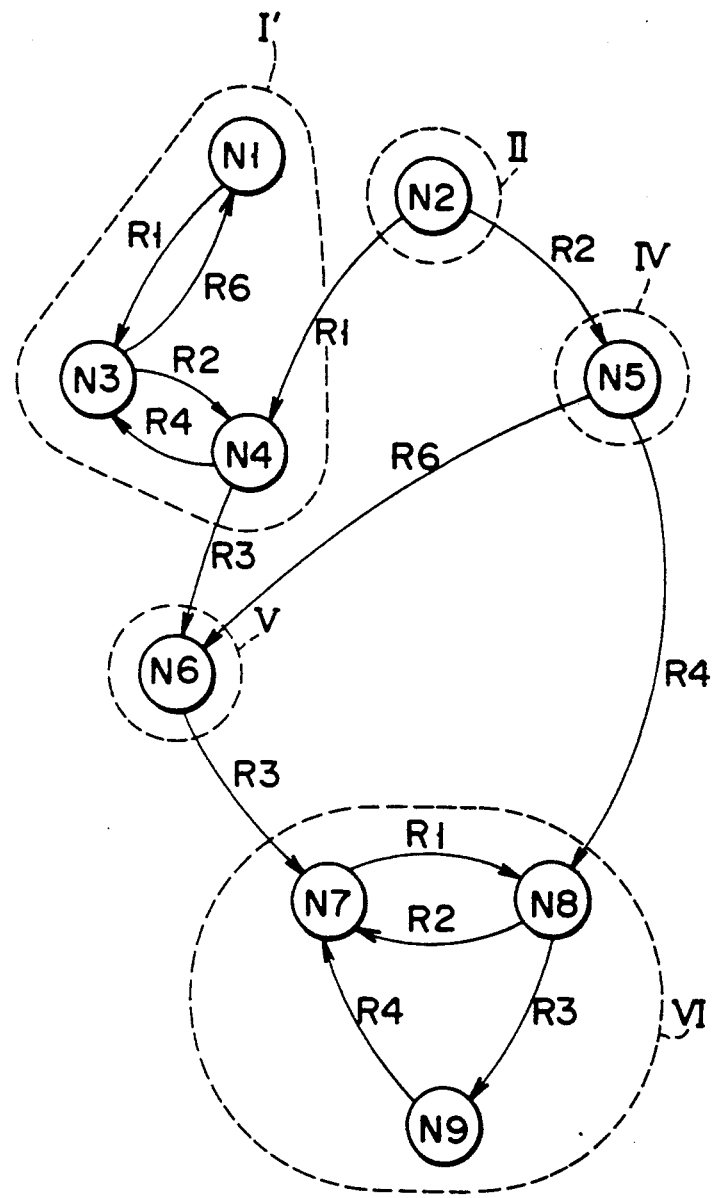
FIG. 23 shows another example of a rule to be registered.

In contrast to this, if a new rule R6, as shown in FIG. 23, is input by the input device 31 to be registered, all the components of the matrix D' corresponding to the non-zero components of the matrix E (FIG. 24) are zero. As a result, the rule R6 is registered. Upon registration of the rule R6, new partial orders III<I and IV<V are obtained, as well as a new strongly-connected component I' integrating the strongly-connected components I and III, as shown in FIG. 23. In other words, the rule R6 is not redundant with regard to the rules R1 to R4, and therefore the contents of the production rule memory 33 are changed, as are the partial orders between the strongly-connected components, as shown in FIG. 25.

The strongly-connected components thus changed upon the registration of the rule R6 are stored in the meta knowledge memory 35.

The interpreter 36 generally directs the inference process on the basis of the meta knowledge, sequentially extracts and executes the production rules in the rule memory 33, and stores results obtained in the course of the inference in the working memory 37. Assume that as an example of inference, it is required to determine whether the state represented by the node N9 can be obtained as an inference result from an initial state represented by the node N5. The initial state (node N5) is included in the strongly-connected component IV, and the inference result (node N9) is included in the strongly-connected component VI. Therefore, the interpreter 36 searches for a path starting from the strongly-connected component IV to the strongly-connected component VI. As a result, a path IV→V→VI and a path IV→VI are searched for. It is found that this result can be derived from the initial state and that it is preferable to apply the rule R4 than the rule R6.

According to the third embodiment, the general direction of inference can be obtained. Further, a redundant rule is prevented from being registered, since redundant rule is judged prior to any new rule being registered. In this way, inference speed is increased.

In the above description, the rule judging circuit 32 judges the redundancy of a rule prior to registration. However, it is possible to replace the rule judging circuit 32 with a rule deletion circuit for deleting a redundant rule from the memory 33. The rule deletion circuit first determines whether or not the strongly-connected components will be changed if a given rule is deleted, and deletes the rule if it is determined that the strongly-connected components will not be changed.

FIG. 26 is a block diagram of a fourth embodiment of the present invention. The aim of the fourth embodiment is to obtain a two types of meta knowledge; one is made up of production rules satisfying transition conditions between the strongly-connected components of the production rules, and the other is made up of production rules satisfying transition conditions between groups of strongly-connected components which are obtained by classifying the strongly-connected components of the production rules. These types of meta knowledge are used for generally directing the inference process. To achieve the above aim, the fourth embodiment comprises a production rule memory 41, a directed-graph matrix decomposing circuit 42, a classification circuit 43, a meta knowledge memory 44, a production system interpreter 45, and a working memory 46.

As in the above embodiments, the rule memory 41 stores production rules each comprising a pair made up of a condition part and a conclusion part.

The directed-graph matrix decomposing circuit 42 generates the first meta knowledge by extracting the production rules from the production rule memory 41 prior to inference processing in the production system interpreter 45. More specifically, the directed-graph matrix decomposing circuit 42 obtains production rules satisfying transition conditions between all the combinations of states which are represented by variables included in the production rules stored in the production rule memory 41, as a directed-graph matrix, decomposes the directed-graph matrix into strongly-connected components, and obtains, as the first meta knowledge, 1) variable-conditions of the respective strongly-connected components, 2) partial orders between the strongly-connected components, and 3) production rules satisfying transition conditions between the respective strongly-connected components.

The classification circuit 43 calculates the period of each strongly-connected component generated by the directed-graph matrix decomposing circuit 42, and classifies the strongly-connected components into several groups in accordance with their periods. After classification, the classification circuit 43 obtains, as the second meta knowledge, 1) variable-conditions of the respective groups of the strongly-connected components, 2) partial orders between the strongly-connected component groups, and 3) production rules satisfying transition conditions between the respective strongly-connected component groups.

The meta knowledge memory 44 stores the first meta knowledge obtained by the directed-graph matrix decomposing circuit 42 and the second meta knowledge obtained by the classification circuit 43.

The interpreter 45 sequentially reads out the production rules stored in the rule memory 41, and executes inference processing. The interpreter 45 generally determines an inference procedure for leading from a given state to another state as a target, on the basis of the meta knowledge stored in the meta knowledge memory 44, and efficiently executes the production rules.

The working memory 46 stores an initial state or an intermediate state in inference processing in the interpreter 45.

Operation of the fourth embodiment having the above-described arrangement will now be described. Assume that six production rules R1 to R6 shown in FIG. 27 are stored in the production rule memory 41.

A directed-graph matrix as shown in FIG. 28 is obtained from the production rules R1 to R6. The classification circuit 43 calculates the period of the strongly-connected components shown in FIG. 27. The period is a greatest common measure of the length of the closed loop including an arbitrary node in the directed-graph matrix. The value of the period is the same for all the nodes. The strongly-connected components can be further divided into sub-components if the period is not less than two.

As regards the strongly-connected components shown in FIG. 28, the length of the closed loop N3→N7→N6→N3 including node N3 is three and that of the closed loop N3→N5→N2→N4→N6→N3 including node N3 is five; therefore, the period is one, so that it is not possible to further divide the strongly-connected components in such a case. Therefore it is necessary to divide a production rule into sub-rules so as to make large the period. In this embodiment, the rule R6 is divided into two sub-rules R6-a and R6-b, as shown in FIG. 29.

Figure 30:
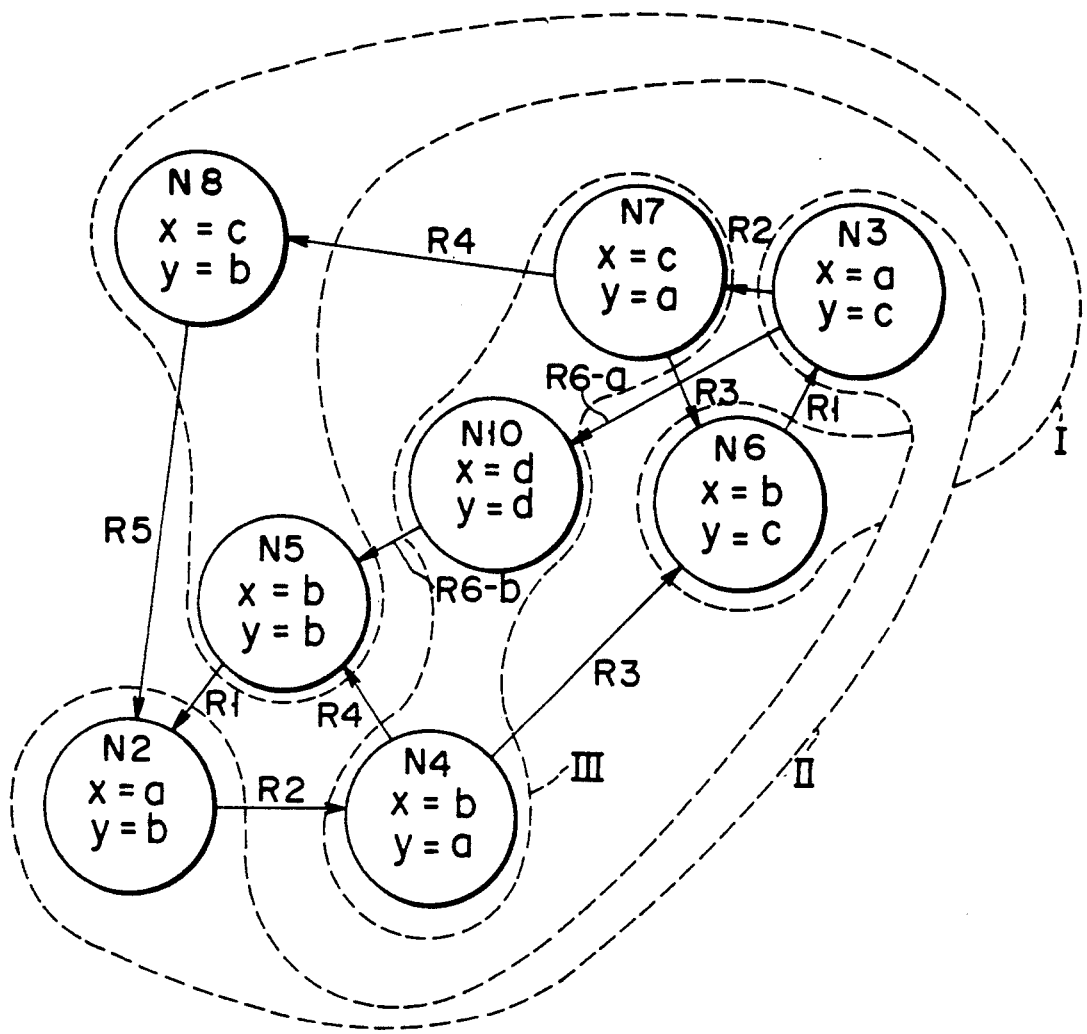
FIG. 30 shows a strongly-connected components of the production rules having the sub rules shown in FIG. 29.
Figure 31:
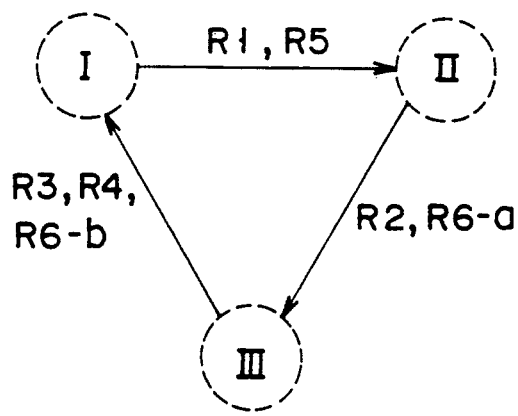
FIG. 31 shows a relationship between the production rules and groups of strongly-connected components.

FIG. 30 shows a directed-graph matrix formed of a combination of the rules including sub-rules R6-a and R6-b. A new node N10 is added as the result of division of the rule R6 into sub-rules R6-a and R6-b. Therefore, the length of the closed loop N3→N10→N5→N2→N4→N6→N3 including node N3 is six, so that the period is three. Thus, it is possible to classify the strongly-connected components shown in FIG. 30 into group I including nodes N5, N6, and N8, group II including nodes N2 and N3, and group III including nodes N4, N7, and N10. The relationship between the groups and rules is shown in FIG. 31.

Figure 32:
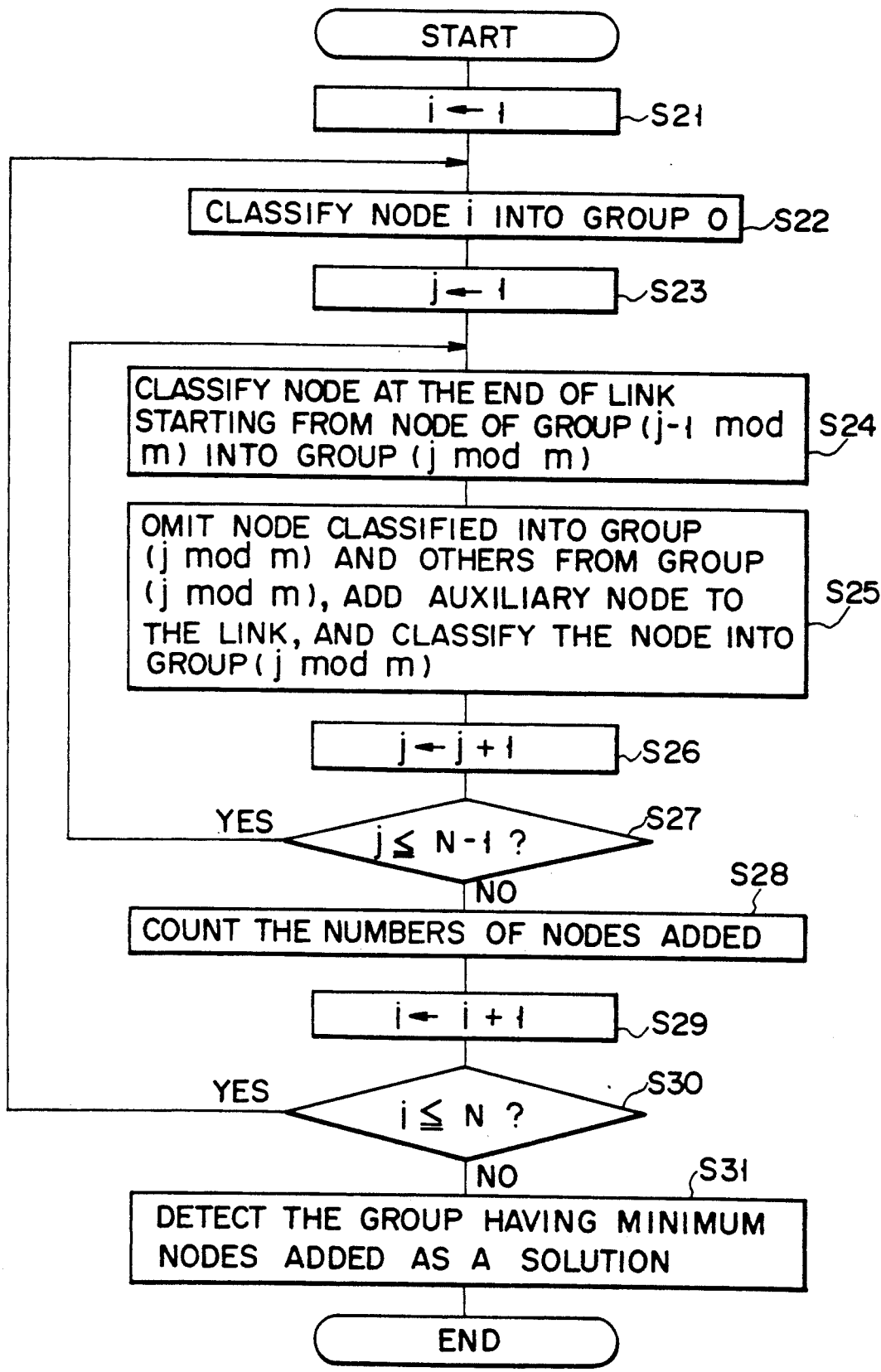
FIG. 32 shows a flow chart showing an operation of classifying the nodes into groups.

FIG. 32 shows a flowchart of the classification of the production rules. This flowchart shows an increase in the period of the strongly-connected components n to m ($n \geq m$) and a classification of the nodes. In steps S21 to S24 and S26 to S30, the nodes are searched for and are assigned by classification numbers. If a node has different classification numbers assigned thereto, an auxiliary node is added to the closed loop including the node in step S25. In step S28, the number of the auxiliary nodes added to the node is counted. The node to which a minimum number of the auxiliary nodes is added is detected as a solution in step S31

Based on this classification, the production rule satisfying the transition condition between the groups is stored in the meta knowledge memory 44 as the second meta knowledge.

When the meta knowledge is stored in the memory 44, inference is started. The interpreter 45 generally directs the inference process on the basis of the meta knowledge, and sequentially extracts and executes the production rules stored in the production rule memory 41, and stores results obtained in the course of the inference in the working memory 46.

Assume that as an example of inference, it is required to determine whether $x=c$ and $y=a$ can be obtained as an inference result from an initial state of $x=a$ and $y=a$.

Referring to the directed-graph of FIG. 28, it is found that either one of the rules R3 and R4 can be applied first. Referring to the directed-graph of FIG. 30, it is found that only one of the rules R1 and R5 can be applied in the initial state which is included in the group I, and the number of applications of the rules is $3 \times i + 2$ ($i = 0, 1, \ldots$) if the target state is included in the group III.

An end condition of a backward inference such as whether or not a given target state can be obtained as an inference result from an initial state is usually checked upon every application of the rule. However, if it is known that the node corresponding to the initial state belongs to a given group and that the node corresponding to the target state belongs to the same or another group, the end condition then need only be checked when the rules are applied n (n being the period of the strongly-connected components) times.

It is preferable to limit the number of auxiliary nodes added to a node in steps 25, even though the object of adding the auxiliary nodes is to simplify the meta knowledge by making some of it redundant. However, if a large number of auxiliary nodes are added, the size of the directed-graph and redundancy of the meta knowledge become too large to enable improvement of the efficiency of inference. An example of such a case is one in which the number of auxiliary nodes added is larger than that of the original nodes. Therefore, it is preferable to select a combination of nodes to increase the period by adding nodes several percent smaller in number than the original nodes. For example, it is preferable to vary a graph of which the period is n (n being usually 1) to one of which the period is m ($n < m \leq N$), and to select the group to which the minimum number of nodes are added.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

As has been described above, since, according to the present invention, a general direction of inference can be determined by using meta knowledge, execution of unnecessary rules can be prevented, and high-speed inference processing can be realized.

What is claimed is:

1. An inference processor system comprising:

rule storage means for storing production rules each formed of a pair consisting of a condition part and a conclusion part;

first meta knowledge generating means for obtaining a directed-graph matrix formed of production rules satisfying transition conditions between all combinations of states of variables included in the production rules stores in said rule storage means, decomposing the directed-graph matrix into strongly-connected components, and obtaining, as a first meta knowledge, conditions of variables of respective strongly-connected components and production rules satisfying transition conditions between the respective strongly-connected components;

a second meta knowledge generating means for classifying the strongly-connected components into strongly-connected component groups in accordance with a period of the strongly-connected components, and obtaining, as a second meta knowledge, a production rule satisfying conditions of variables of respective strongly-connected component groups and transition conditions between the respective strongly-connected component groups;

meta knowledge storing means for storing the first and second meta knowledge generated by said first and second meta knowledge generating means; and interpreter means for determining a general direction inference on the basis of the first and second meta knowledge obtained by said first and second meta knowledge generating means, and executing inference processing by executing a production rule stored in said rule storage means, on the basis of the direction.

2. A system according to claim 1, wherein said second meta knowledge generating means comprises means for increasing the period of the strongly-connected components by decomposing the production rules into sub-rules.

3. An inference processor system comprising:

rule storage means for storing production rules each formed of a pair consisting of a condition part and a conclusion part;

meta knowledge generating means for obtaining a directed-graph matrix formed of production rules satisfying transition conditions between all combinations of states of variables included in the production rules stored in said rule storage means, decomposing the directed-graph matrix into strongly-connected components, and obtaining, as meta knowledge, conditions of variables of respective strongly-connected components and production rules satisfying transition conditions between the respective strongly-connected components;

meta knowledge storing means for storing the meta knowledge generated by said meta knowledge generating means;

interpreter means for detecting a general direction of inference on the basis of the meta knowledge obtained in said meta knowledge generating means, and executing inference processing by executing a production rule stored in said rule storage means, on the basis of the general direction; and means for determining whether or not the strongly-connected components are changed upon registration of a production rule in said rule storing means, registration of the production rule being performed when it is determined that the strongly-connected components are changed, and stopped when it is determined that the strongly-connected components are not changed.

4. An inference processor system comprising:

rule storage means for storing production rules each formed of a pair consisting of a condition part and a conclusion part;

meta knowledge generating means for obtaining a directed-graph matrix formed of production rules satisfying transition conditions between all combinations of states of variables included in the production rules stored in said rule storage means, decomposing the directed-graph matrix into strongly-connected components, and obtaining, as meta knowledge, conditions of variables of respective strongly-connected components and production rules satisfying transition conditions between the respective strongly-connected components;

meta knowledge storing means for storing the meta knowledge generated by said meta knowledge generating means;

interpreter means for determining a general direction of inference on the basis of the meta knowledge obtained in said meta knowledge generating means, and executing inference processing by executing a production rule stored in said rule storage means, on the basis of the general direction; and means for determining whether or not the strongly-connected components are changed upon deletion of a production rule from the rule storing means, deletion of the rule being performed when it is determined that the strongly-connected components are not changed.

* * * * *

UNITED STATES PATENT AND TRADEMARK OFFICE
CERTIFICATE OF CORRECTION

PATENT NO. : 5,245,699
DATED : September 14, 1993
INVENTOR(S) : Kenji Ono

It is certified that error appears in the above-indentified patent and that said Letters Patent is hereby corrected as shown below:

On the title page, Item [54], Column 1 and Line 1,

The title, should read: --INFERENCE PROCESSOR USING META KNOWLEDGE--

Signed and Sealed this

Twenty-second Day of March, 1994

Attest:

BRUCE LEHMAN

*Attesting Officer*     *Commissioner of Patents and Trademarks*